US008663475B2

(12) United States Patent
Lu

(10) Patent No.: US 8,663,475 B2
(45) Date of Patent: Mar. 4, 2014

(54) DIATOMACEOUS EARTH PRODUCTS CONTAINING REDUCED SOLUBLE METAL LEVELS, PROCESSES FOR REDUCING SOLUBLE METAL LEVELS IN DIATOMACEOUS EARTH PRODUCTS, AND METHODS OF USING THE SAME

(75) Inventor: Jie Lu, Lompoc, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 266 days.

(21) Appl. No.: 13/120,199

(22) PCT Filed: Sep. 24, 2009

(86) PCT No.: PCT/US2009/058160
§ 371 (c)(1),
(2), (4) Date: Mar. 22, 2011

(87) PCT Pub. No.: WO2010/036763
PCT Pub. Date: Apr. 1, 2010

(65) Prior Publication Data
US 2011/0174732 A1 Jul. 21, 2011

Related U.S. Application Data

(60) Provisional application No. 61/100,511, filed on Sep. 26, 2008.

(51) Int. Cl.
B01D 24/00 (2006.01)
B01D 61/00 (2006.01)
B01J 20/14 (2006.01)

(52) U.S. Cl.
USPC ........... 210/639; 210/193; 210/777; 252/175; 426/431; 106/811; 423/335; 423/304; 423/305; 423/315

(58) Field of Classification Search
USPC ......... 210/638, 639, 650, 651, 777–779, 193; 426/11, 431; 252/175; 106/811, 812; 423/335, 339, 304, 305, 315
See application file for complete search history.

(56) References Cited

U.S. PATENT DOCUMENTS

| 2,426,140 | A | * | 8/1947 | Bollaert | 106/468 |
|---|---|---|---|---|---|
| 2,701,240 | A | | 2/1955 | Bregar | |
| 2,946,755 | A | | 7/1960 | Frankenhoff | |
| 3,421,845 | A | | 1/1969 | Peterson | |
| 3,915,735 | A | | 10/1975 | Moreland | |
| 3,996,131 | A | * | 12/1976 | Conn | 210/636 |
| 4,202,910 | A | * | 5/1980 | Bradley et al. | 426/423 |
| 4,260,498 | A | | 4/1981 | Sample, Jr. et al. | |
| 4,288,462 | A | * | 9/1981 | Hou et al. | 426/423 |
| 4,320,009 | A | * | 3/1982 | Hilton et al. | 210/651 |
| 4,325,844 | A | | 4/1982 | Olmsted, Jr. | |
| 4,366,068 | A | * | 12/1982 | Ostreicher et al. | 210/767 |
| 4,414,113 | A | * | 11/1983 | LaTerra | 210/636 |
| 4,430,108 | A | | 2/1984 | Hojaji et al. | |
| 4,755,227 | A | | 7/1988 | Sherif et al. | |
| 4,765,906 | A | * | 8/1988 | Downing et al. | 210/636 |
| 4,965,084 | A | * | 10/1990 | Austin et al. | 426/422 |
| 5,179,062 | A | | 1/1993 | Dufour | |
| 5,710,090 | A | | 1/1998 | Dufour | |
| 5,954,872 | A | | 9/1999 | Benson | |
| 6,039,875 | A | | 3/2000 | Christiansen et al. | |
| 6,139,313 | A | | 10/2000 | Kostuch et al. | |
| 6,555,151 | B2 | | 4/2003 | Hu et al. | |
| 7,144,533 | B2 | * | 12/2006 | Koslow | 264/49 |
| 2002/0094364 | A1 | | 7/2002 | Hu et al. | |
| 2010/0323073 | A1 | * | 12/2010 | Lu | 426/271 |

FOREIGN PATENT DOCUMENTS

| CN | 1465525 A | 1/2004 |
|---|---|---|
| CN | 1559669 A | 1/2005 |
| CN | 1314589 C | 3/2006 |
| JP | 1 153564 A | 6/1989 |
| SU | 822 848 | 4/1981 |
| SU | 822 848 B | 4/1981 |
| WO | WO 2005/117616 A2 | 12/2005 |
| WO | WO 2006/065556 A2 | 6/2006 |
| WO | WO 2008/024952 A2 | 2/2008 |
| WO | WO 2009/094299 A1 | 7/2009 |
| WO | WO 2010/036763 A1 | 4/2010 |

OTHER PUBLICATIONS

International Search Report and Written Opinion issued Dec. 4, 2009, in International Application No. PCT/US2009/058160 filed Sep. 24, 2009.
Ralston, O. C.; Stern, A. George, "Report of the Nonmetals Division, fiscal year 1942", U. S. Bur. Mines, Rept. Investigations, 1942—3 pages.
Office Action issued Feb. 28, 2013, in related Chinese Patent Application No. 200980147781.4.
Extended European Search Report issued Dec. 6, 2012, in related European Application No. 09816831.3.

* cited by examiner

Primary Examiner — Joseph Drodge

(74) Attorney, Agent, or Firm — Finnegan, Henderson, Farabow, Garrett & Dunner, L.L.P.

(57) ABSTRACT

Disclosed herein are diatomaceous earth products containing reduced soluble metal levels, processes for reducing soluble metal levels in diatomaceous earth products, and methods of using the same. In particular, diatomaceous earth products are disclosed that have been treated with at least one surface metal blocking agent, and then subjected to at least one thermal treatment process to reduce the level of soluble metals associated therewith. Such diatomaceous earth products containing reduced soluble metal levels may be useful for various applications including, but not limited to, as filter aid materials.

20 Claims, No Drawings

DIATOMACEOUS EARTH PRODUCTS CONTAINING REDUCED SOLUBLE METAL LEVELS, PROCESSES FOR REDUCING SOLUBLE METAL LEVELS IN DIATOMACEOUS EARTH PRODUCTS, AND METHODS OF USING THE SAME

This application is a U.S. national stage entry under 35 U.S.C. §371 from PCT International Application No. PCT/US2009/058160, filed Sep. 24, 2009, and claims priority to and the benefit of the filing date of U.S. Provisional Application No. 61/100,511, filed Sep. 26, 2008, the subject matter of both of which is incorporated herein by reference.

FIELD OF THE INVENTION

Disclosed herein are diatomaceous earth products containing reduced soluble metal levels, processes for reducing soluble metal levels in diatomaceous earth products, and methods of using the same. Such diatomaceous earth products containing reduced soluble metal levels may be useful for various applications, including but not limited to as filter aid materials.

BACKGROUND OF THE INVENTION

Diatomaceous earth products are obtained from diatomaceous earth (also called "DE" or "diatomite"), which is generally known as a sediment enriched in biogenic silica (La, silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures comprising two valves that, in the living diatom, fit together much like a pill box.

Diatomaceous earth may form from the remains of water-borne diatoms and, therefore, diatomaceous earth deposits may be found close to either current or former bodies of water. Those deposits are generally divided into two categories based upon source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

In the field of filtration, methods of particle separation from fluids may employ diatomaceous earth products as filter aids. The intricate and porous structure unique to diatomaceous earth may, in some instances, be effective for the physical entrapment of particles in filtration processes. It is known to employ diatomaceous earth products to improve the clarity of fluids that exhibit turbidity or contain suspended particles or particulate matter.

Diatomaceous earth may be used in various embodiments of filtration. As a part of pre-coating, diatomaceous earth products may be applied to a filter septum to assist in achieving, for example, any one or more of: protection of the septum, improvement in clarity, and expediting of filter cake removal. As a part of body feeding, diatomaceous earth may be added directly to a fluid being filtered to assist in achieving, for example, either or both of: increases flow rate and extensions of the filtration cycle. Depending on the requirements of the specific separation process, diatomaceous earth may be used in multiple stages or embodiments including, but not limited to, in pre-coating and in body feeding.

Diatomaceous earth filter aids may also comprise metals, such as iron, that may be soluble in the liquid media being filtered. When those diatomaceous earth filter aids are used to filter liquids, the metals may disassociate from the diatomaceous earth filter aid and enter the liquid media. In many applications, this increase in metal content of the liquid media may be undesirable or even unacceptable. For example, when diatomaceous earth filter aids may be used to filter beer, a high level of iron dissolved in the beer originating from the filter aid material may adversely affect sensory or other properties, including but not limited to taste and shelf-life. Other non-diatomaceous earth filter aids may suffer from a similar metal-leaching effect. Thus, the brewing industry has long recognized the importance of reducing iron dissolution in beer and has sought out filter aids with increasingly lower beer soluble iron (BSI) contents.

The brewing industry has developed at least two protocols to measure the BSI of diatomaceous earth filter aids. The European Beverage Convention (EBC) method contacts a potassium hydrogen phthalate solution with the filter aid and then analyzes the filtered liquid for iron content. The American Society of Brewing Chemists (ASBC) method contacts a sample of beer with the filter aid and then measures the resulting iron content in the liquid. Other protocols may also be known and used.

The EBC method uses an international method for determining the beer soluble iron content of a filter aid. More specifically, the EBC method uses, for example, about 10 g/L solution of potassium hydrogen phthalate (KHP, $KHC_8H_4O_4$) in distilled water as the extractant. In the EBC method, about 5 g of a filter aid sample is mixed with about 200 mL of the KHP solution for about 2 hours using a magnetic stirrer so that the filter aid remains in suspension during extraction. The resulting solution is then filtered immediately through a filter paper, about the first 50 mL is discarded, and about the next 100 mL is collected for analysis. Extracts are then analyzed for iron concentration by the FERROZINE method, in which a FerroZine® reagent (disodium salt of 3-(2-pyridyl)-5,6-bis (4-phenylsulfonic acid)-1,2,4-triazine, $C_{20}H_{14}N_4O_6S_2$, available from Aldrich) may be used as the color development reagent. Typically, the FerroZine® reagent is prepared by dissolving about 5 g of FerroZine® reagent in about 1000 mL of an ammonium acetate/acetic acid buffer with a pH of about 4.3. The FERROZINE method uses about a 25 mL portion of the extractant, and treated with about 25 mg of ascorbic acid ($C_6H_8O_6$) to reduce dissolved iron ions to the ferrous ($Fe^{2+}$) state, thus yielding a colored iron complex with the FerroZine® when color is developed by adding about 1 mL of the FerroZine® reagent. After about 30 minutes, the absorbance of the resulting sample solution is compared to a standard calibration curve. Absorbance is measured at about 565 nm using a spectrophotometer and compared against the standard to measure BSI.

The ASBC method may measure BSI content by placing about 5 g sample of a filter aid material in about 200 mL of de-carbonated beer (for example, BUDWEISER® from Anheuser-Busch, St. Louis, Mo., USA) at room temperature and swirling the mixture intermittently for an elapsed time of about 5 minutes and 50 seconds. The mixture is then immediately transferred to a funnel containing about 25 cm diameter filter paper, from which the filtrate collected during about the first 30 seconds is discarded. Filtrate is collected for about the next 150 seconds, and an about 25 mL portion is treated with about 25 mg of ascorbic acid ($C_6H_8O_6$) to reduce dissolved iron ions to the ferrous ($Fe^{2+}$) state, thus yielding a sample extract. Color is then developed by adding about 1 mL of about 0.3% (w/v) 1,10-phenanthroline and, after about 30 minutes, the absorbance of the resulting sample solution is compared to a standard calibration curve. The calibration curve is prepared from standard solutions of known iron concentrations in beer. Untreated filtrate is used as a method blank to correct for turbidity and color. Absorbance is measured at about 505 nm using a spectrophotometer and compared against the standard to measure BSI.

Many methods have been developed to reduce the content of BSI in diatomaceous earth filter aids. One such method is crude diatomaceous earth filter aid selection. Some deposits of diatomaceous earth naturally contain less iron than diatomaceous earth material from deposits in other locations. Crude selection alone, however, may not be sufficient to supply the brewing industry and other applications with reduced BSI or iron-content diatomaceous earth.

Another method known to reduce BSI content in diatomaceous earth is the process of calcination. Calcination generally involves heating diatomaceous earth at a high temperature, for example in excess of about 900° C. Calcination may reduce the presence of organics and volatiles in the diatomaceous earth and induce a color change from off-white to tan or pink. Because of agglomeration and sintering of fine particles, such as fine diatomaceous earth fragments and clays, during calcinations, the surface area of diatomaceous earth is generally reduced. In one example, the DE surface area is reduced from about 25 $m^2/g$ to about 45 $m^2/g$ for the natural diatomaceous earth to less than about 10 $m^2/g$, thus leading to the reduction of soluble metals, including but not limited to iron.

Additionally, the beer soluble iron content of a diatomaceous earth filter aid, particularly the BSI as measured by ASBC method, may decrease naturally and gradually with time after calcination. Surface re-hydration by humidity in the ambient air, for example, is one mechanism of BSI reduction. Achieving BSI reduction naturally, however, may take months, and the results may fluctuate with seasons and crude selection.

Apart from or in addition to crude selection and calcination process control, chemicals may be applied to filter aids to reduce BSI content. Chemical processes include, for example, acid-washing and/or leaching with chelating solutions such as EDTA or citric acid. Although such methods can be somewhat effective to reduce surface soluble metals, the processes are usually expensive. In addition, highly soluble metals may re-emerge in the filter aids if abundant refreshed surfaces reappear during chemical or mechanical processing. Furthermore, in some applications, chemical treatments may be undesirable or unacceptable. For instance, in applications regulated by the U.S. Food and Drug Administration, water is the only chemical allowed in the post-calcination processing of filter aids without the chemical undesirably being labeled as an additive.

Water treatment may comprise, for example, spraying water to the bottom of a bulk container comprising filter aids or into bags during packaging. Water treatment at higher temperatures is known to accelerate the BSI reduction process, yet because water treatment generally occurs in an open container, the temperature of the treatment cannot be higher than the boiling point of water. Typical water treatments may include spraying and mixing water into a diatomaceous earth filter aid product while the product is hot (for example, at a temperature ranging from about 150° F. to about 200° F.). The treated product may be held in containers, such as bins and rail cars, until the BSI is reduced to the desired level. Water treatments may also comprise the use of steam treatment. However, the BSI reduction effects of water treatments are often limited in BSI reduction and, therefore, water-treatment cannot be used to effectively treat filter aids that may have relatively high BSI levels, such as some diatomaceous earth.

Although calcination and water treatment may generally reduce the BSI content of diatomaceous earth filter aids and are generally effective for straight calcined diatomaceous earth products, in which reduced BSI is generally measured by the ASBC method. However, when the BSI is determined by the EBC method (e.g., using about 1% KHP as the extractant and extracting for about 2 hours), the BSI in the filter aids is much higher than determined by the ASBC method, in which a beer is used. Additionally, water treatment generally does not generate a measurable reduction in BSI if it is determined by the EBC method. Generally, the BSI of a diatomaceous earth filter aid as measured by the EBC method is several times higher than the BSI as measured by the ASBC method, which is generally due to the fact that KHP is a much stronger chelating agent for iron than the chelating compounds present in beer.

In addition, when diatomaceous earth is calcined with an alkali flux agent, such as soda ash, the flux-calcined products generally show higher BSI than straight calcined products, generally because of the surface iron liberation by alkali ions. The BSI levels are also generally affected by the calcination intensity that the products received; intensively heated products generally show less BSI than the less intensively heated products.

EBC protocols and standards are widely used by the brewing industry, and the diatomaceous earth filter aids used for beer filtration are desired to have low beer soluble iron as determined by the EBC method. Therefore, there exists a need for a low soluble metal containing diatomaceous earth filter aid product, as well as an inexpensive and effective method for reducing the amount of soluble metals in diatomaceous earth crudes, that may acceptably be used in applications requiring low metal content or dissolution. In particular, there exists a need for a low soluble metal containing diatomaceous earth filter aid product, as that soluble metal content is determined by an EBC method. Applicant has surprisingly found that such a diatomaceous earth product containing reduced soluble metal levels may be achieved by treating diatomaceous earth with at least one surface metal blocking agent, before at least one thermal treatment.

SUMMARY OF THE INVENTION

Disclosed herein are processes for decreasing the content of at least one soluble metal in at least one natural diatomaceous earth material. In one embodiment, the process for decreasing the content of at least one soluble metal in at least one natural diatomaceous earth material the comprises subjecting at least one natural diatomaceous earth material to at least one treatment with at least one surface metal blocking agent, before performing at least one thermal treatment. In another embodiment, the process comprises subjecting at least natural one diatomaceous earth material to at least one treatment with at least a portion of at least one spent filter cake comprising at least one surface metal blocking agent, before performing at least one thermal treatment. In a further embodiment, the process comprises subjecting at least one natural diatomaceous earth material to at least one treatment with at least one surface metal blocking agent and at least a portion of at least one spent filter cake comprising at least one surface metal blocking agent, before performing at least one thermal treatment. In yet another embodiment, the process comprises providing at least one natural diatomaceous earth material, at least one treatment with at least one surface metal blocking agent, and at least one thermal treatment.

Also disclosed herein are treated diatomaceous earth products. In one embodiment, the treated diatomaceous earth product comprises at least one natural diatomaceous earth material and at least one surface metal blocking agent. In another embodiment, the treated diatomaceous earth product comprises at least one natural diatomaceous earth material and at least a portion of at least one spent filter cake comprising at least one surface metal blocking agent.

Further disclosed herein are methods for filtering a liquid. In one embodiment, the method comprises passing at least one liquid through at least one filter membrane comprising at least one treated diatomaceous earth product comprising at least one diatomaceous earth material and at least one surface metal blocking agent. In one embodiment, the at least one liquid is selected from the group consisting of an oil and a beverage. In another embodiment, the at least one liquid is beer. In a further embodiment, the at least one liquid is wine.

Further disclosed herein are methods for removing at least one soluble metal from at least one liquid. In one embodiment, the method comprises contacting at least one liquid with at least one filter comprising at least one treated diatomaceous earth product. In one embodiment, the at least one liquid is selected from the group consisting of an oil and a beverage. In another embodiment, the at least one liquid is a beer.

DETAILED DESCRIPTION OF THE INVENTION

This application describes, in part, new processes for reducing at least one soluble metal from at least one diatomaceous earth material, diatomaceous earth products having reduced soluble metal content, and methods for using such reduced soluble metal diatomaceous earth. In one embodiment, the diatomaceous earth product may be used as a particulate filter aid and/or may be a part of a filter medium made from such a particulate filter aid. In another embodiment, at least one natural diatomaceous earth is treated with at least surface metal blocking agent, and then subjected to at least one thermal treatment. In a further embodiment, the methods described herein eliminate or reduce soluble metals without affecting performance of the filter aids.

As used herein, the term "soluble metal" refers to any metal that may be dissolved in at least one liquid. Soluble metals include those known to one of ordinary skill in the art. Exemplary soluble metals include, but are not limited to, iron, aluminum, vanadium, chromium, copper, zinc, nickel, cadmium, and mercury. In one embodiment, the soluble metal is iron.

At Least One Natural Diatomaceous Earth

The diatomaceous earth products of the present invention comprise at least one natural diatomaceous earth. In one embodiment, the at least one natural diatomaceous earth is from a saltwater source. In another embodiment, the at least one natural diatomaceous earth is from a freshwater source. In a further embodiment, the at least one natural diatomaceous earth is any diatomaceous earth material that may be capable of use in a filter aid product, either in its crude form or after subjecting the material to one or more processing steps. In yet another embodiment, the at least one natural diatomaceous earth is any diatomaceous earth material that, after treatment with at least one surface metal blocking agent and/or at least one thermal treatment, may experience reduced soluble metal content. In yet a further embodiment, the at least one natural diatomaceous earth is any diatomaceous earth material that has not been subjected to at least one thermal treatment. In still another embodiment, the at least one natural diatomaceous earth is any diatomaceous earth material that has not been subjected to calcination.

As stated earlier, natural diatomaceous earth is, in general, a sedimentary biogenic silica deposit comprising the fossilized skeletons of diatoms, one-celled algae-like plants that accumulate in marine (saltwater) or freshwater environments. Honeycomb silica structures generally give diatomaceous earth useful characteristics such as absorptive capacity and surface area, chemical stability, and low-bulk density. In one embodiment, natural diatomaceous earth comprises about 90% $SiO_2$ mixed with other substances. In another embodiment, crude diatomaceous earth comprises about 90% $SiO_2$, plus various metal oxides, including but not limited to Al, Fe, Ca, and Mg oxides. In a further embodiment, the at least one natural diatomaceous earth comprises at least one metal ion.

The at least one natural diatomaceous earth may have any of various appropriate forms now known to the skilled artisan or hereafter discovered. In one embodiment, the at least one natural diatomaceous earth is unprocessed (e.g., not subjected to chemical and/or physical modification processes). Without wishing to be bound by theory, the impurities in natural diatomaceous earth, such as clays and organic matters, may, in some embodiments, provide higher cation exchange capacity. In another embodiment, the at least one natural diatomaceous earth undergoes minimal processing following mining or extraction. In a further embodiment, the at least one natural diatomaceous earth is subjected to at least one physical modification process. The skilled artisan will readily know physical modification processes appropriate for use in the present inventions, which may be now known or hereafter discovered; appropriate physical modification processes include but are not limited to milling, drying, and air classifying. In yet another embodiment, the at least one natural diatomaceous earth is subjected to at least one chemical modification process. The skilled artisan will readily know chemical modification processes appropriate for use in the present inventions, which may be now known or hereafter discovered; appropriate chemical modification processes include but are not limited to soluble metal blocking treatments involving calcination with an aluminate, an aluminosilicate, a sulfate/sulfite, and other silica surface modification compounds. In one embodiment, the chemical modification process is acid leaching. In another embodiment, the chemical modification process is acid washing. In a further embodiment, the chemical modification process comprises treatment with a silane or siloxane, as for example disclosed in PCT International Publication Nos. WO 05/117616 A2 and WO 06/065556 A2.

In one embodiment, the at least one natural diatomaceous earth is a commercially available diatomaceous earth product. In another embodiment, the at least one natural diatomaceous earth is a marine origin diatomite product available from World Minerals, Inc. In a further embodiment, the at least one natural diatomaceous earth is a Mexican MNPP (disc-shaped diatomaceous earth) product available from World Minerals, Inc. In yet another embodiment, the at least one natural diatomaceous earth is the kiln feed from Mexican freshwater diatomite, available from World Minerals, Inc. In yet a further embodiment, the at least one natural diatomaceous earth is the kiln feed from Chinese freshwater diatomite, available also from World Minerals, Inc.

Classification Step

Before or after being contacted with the at least one surface metal blocking agent, the at least one natural diatomaceous earth may undergo at least one classification step. In one embodiment, before treatment with the at least one surface metal blocking agent, the powder size of the at least one natural diatomaceous earth is adjusted to a suitable or desired size using any one of several techniques well known in the art. In another embodiment, the at least one natural diatomaceous earth undergoes at least one mechanical separation to adjust the powder size distribution before treatment with the at least one surface metal blocking agent. Appropriate mechanical separation techniques are well known to the skilled artisan and include, but are not limited to, milling, grinding, screening, extrusion, triboelectric separation, liquid classification, and air classification.

Surface Metal Blocking Agent

The at least one natural diatomaceous earth is treated with at least one surface metal blocking agent comprising at least one phosphorus-containing composition. The at least one natural diatomaceous earth may be treated with at least one surface metal blocking agent either before or after being subjected to at least one thermal treatment. The selection of the at least one phosphorus-containing composition may vary according to the choice of the at least one natural diatomaceous earth and the desired end product. Appropriate phosphorus-containing compositions are well-known to the skilled artisan, and include those now known or that may be hereafter discovered. In one embodiment, the phosphorus-containing composition is a phosphate. In one embodiment, the phosphate is sodium triphosphate. In another embodiment, the phosphate is sodium phosphate. In a further embodiment, the phosphate is sodium pyrophosphate. In yet another embodiment, the phosphate is sodium hexametaphosphate. In yet a further embodiment, the phosphate is monobasic potassium phosphate. In still another embodiment, the phosphate is potassium phosphate. In still a further embodiment, the phosphate is aluminum phosphate. In another embodiment, the phosphate is chosen from the group including, but not limited to, diphosphates (pyrophosphates), triphosphates, metaphosphates, ammonium phosphate, mixed phosphate salts, phosphine, phosphine oxide, phosphinites ($P(OR)R_2$), phosphonites ($P(OR)_2R$), phosphites ($P(OR)_3$), phosphinates ($OP(OR)R_2$), and phosphonates ($OP(OR)_2R$).

In another embodiment, the phosphorus-containing composition is supplied in the form of at least part of at least one spent filter cake. In one embodiment, the spent filter cake results from food processing. In another embodiment, the spent cake results from corn syrup filtration. In further embodiment, any spent filter cake comprising at least one phosphate is used. In a further embodiment, the spent filter cake may be used to alter the reduction-oxidation conditions in the calcinations kiln so as to enhance the reduction of iron species. In one embodiment, the amount of the at least one part of at least one spent filter cake used for treating the at least one diatomaceous earth depends on the phosphorus content of the at least one part. In one embodiment, the phosphorus content of the at least one part of the at least one spent filter cake is from about 0.2% to about 4% (measured as $P_2O_5$).

The at least one phosphorus-containing composition may be present in any and various amounts required or desired to produce a desired level of decreased soluble metal content. The amount of phosphorus-containing composition employed may also vary depending upon the surface area of the diatomaceous earth material to be treated. In one embodiment, the at least one phosphorus-containing composition is present in an amount of from about 0.2% to about 10%, relative to the weight of the at least one natural diatomaceous earth. In another embodiment, the at least one phosphorus-containing composition is present in an amount of from about 0.2% to about 1%. In a further embodiment, the at least one phosphorus-containing composition is present in an amount of from about 0.2% to about 0.6%. In yet another embodiment, the at least one phosphorus-containing composition is present in an amount of from about 0.4% to about 0.6%. In yet a further embodiment, the at least one phosphorus-containing composition is present in amount less than about 5.0%. In still a further embodiment, the at least one phosphorus-containing composition is present in an amount less than about 10.0%.

The at least one soluble metal blocking agent may comprise at least one chelating agent. In one embodiment, the at least one phosphorous-containing composition of the at least one soluble metal blocking agent is at least one chelating agent. In another embodiment, the at least one soluble metal blocking agent comprises at least one phosphorus-containing composition and at least one chelating agent. In one embodiment, the at least one chelating agent is at least one basic organic compound. In one embodiment, the at least one basic organic compound is chosen from the group consisting of primary, secondary, and tertiary (poly)amines. In another embodiment, the at least one basic organic compound is methylamine. In a further embodiment, the at least one basic organic compound is ethylamine. In yet another embodiment, the at least one basic organic compound is diethylamine. In yet a further embodiment, the at least one basic organic compound is 1,3-propanediamine.

In another embodiment, the at least one basic organic compound comprises at least one amino ether. In one embodiment, the at least one basic compound is chosen from the group consisting of polyether amines and morpholines.

In a further embodiment, the at least one basic organic compound comprises at least one alkanolamine. In one embodiment, the at least one basic organic compound is chosen from the group consisting of 2-amino-2-methyl-1-propanol (2-AMP), monoethanolamine, diethanolamine, triethanolamine (TEA), monoisopropanolamine, triisopropanolamine, diethylaminoethanol (DEAE), methylethanolamine, dimethylethanolamine, ethylaminoethanol, aminomethylpropanol, and alkanolamine aminomethylpropanol (AMP).

In yet another embodiment, the at least one basic organic compound comprises at least one aminosilane. In one embodiment, the at least one basic compound is chosen from the group consisting of 3-aminopropyltrimethoxysilane, N-(2-aminoethyl)-3-aminopropyltrimethoxysilane, trimethoxysilylpropyldiethylenetriamine, 2-(trimethoxysilylethyl)pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-amino propyltriethoxysilane.

In yet a further embodiment, the at least one basic organic compound comprises at least one ethyleneamine. In one embodiment, the at least one basic organic compound is chosen from the group including, but not limited to, ethylenediamine, ethylenediamine tetraacetic acid (EDTA), dicarboxylic acids, citric acid, ethanedioic acid, propanedioic acid, butanedioic acid, pentanedioic acid, hexanedioic acid, heptanedioic acid, octanedioic acid, nonanedioic acid, decanedioic acid, benzene-1,2-dicarboxylic acid, o-phthalic acid, benzene-1,3-dicarboxylic acid, m-phthalic acid, benzene-1,4-dicarboxylic acid, p-phthalic acid, (2S)-2-acetamidopentanedioic acid, tricarboxylic acids, isocitric acid, aconitic acid, propane-1,2,3-tricarboxylic acid, tricarballylic acid, carballylic acid, diethylenetriamine, piperazine, N-aminoethylpiperazine, triethylenetetramine, tetraethylenepentamine, pentaethylenehexamine, and higher molecular weight ethylenepolyamines.

In still another embodiment, at least one basic organic compound comprises at least one aminoester. In one embodiment, the at least one basic organic compound is chosen from organic compounds comprising ester-substituents chosen from primary, secondary, and tertiary amines of acrylic and methacrylic acids. In another embodiment, the at least one basic organic compound is chosen from N-substituted acrylamides, wherein the alkyl group comprises from 2 to 12 carbon atoms, including but not limited to N-ethylacrylamide, N-tert-butylacrylamide, N-tert-octylacrylamide, N-octylacrylamide, N-decylacrylamide, and N-dodecylacrylamide. In a further embodiment, the at least one basic organic compound is chosen from N-substituted methacrylamides, wherein the alkyl group comprises from 2 to 12 carbon atoms, including but not limited to N-ethylmethacrylamide, N-tert-butylmethacrylamide, N-tert-octylmethacrylamide, N-octylmethacrylamide, N-decylmethacrylamide, and N-dodecylmethacrylamide. In yet another embodiment, the at least one basic organic compound is chosen from the group consisting of aminoethyl, butylaminoethyl, N,N'-dimethylaminoethyl, and N-tert-butylaminoethyl methacrylates.

The at least one soluble metal blocking agent may be added to the at least one natural diatomaceous earth in any manner now known to the skilled artisan or hereafter discovered that results in one or more components of the agent becoming at least partially bonded to at least one surface of the natural diatomaceous earth and/or the metal ions associated therewith. In one embodiment, the at least one soluble metal blocking agent is added to a dry powder of the at least one natural diatomaceous earth at ambient or an elevated temperature. In such an embodiment, one or more components of the at least one soluble metal blocking agent may quickly bond to surfaces of the at least one natural diatomaceous earth and to the at least one metal ion associated with the at least one natural diatomaceous earth. In another embodiment, addition of the at least one soluble metal blocking agent to the at least one natural diatomaceous earth does not significantly affect the surface hydrophilicity of the natural diatomaceous earth, such that the at least one soluble metal blocking agent does not significantly affect the mixing properties and/or permeability of the diatomaceous earth material when used in liquid-solid separations. In a further embodiment, the at least one soluble metal blocking agent is added to the at least one natural diatomaceous earth just before the at least one thermal treatment. In yet another embodiment, at least one dry soluble metal blocking agent is added to at least one dry natural diatomaceous earth at ambient or an elevated temperature. As used herein, "dry" indicates a water content less than about 5%.

Thermal Treatment

In one embodiment, after the at least one natural diatomaceous earth is treated with the at least one surface metal blocking agent, the treated diatomaceous earth is subjected to at least one thermal treatment to create a thermally-treated diatomaceous earth product. In another embodiment, after the at least one natural diatomaceous earth is subjected to at least one thermal treatment, the thermally treated diatomaceous earth is treated with at least one surface metal blocking agent to create a thermally-treated diatomaceous earth product. The selection of the at least one thermal treatment may vary according to, inter alia, the at least one natural diatomaceous earth, the at least one surface metal blocking agent, and the desired end product. Appropriate thermal treatment processes are well-known to the skilled artisan, and include those now known or that may hereafter be discovered. In one embodiment, the least one thermal treatment decreases the amount of organics and/or volatiles in the treated diatomaceous earth. In another embodiment, the at least one thermal treatment is any treatment that reduces the soluble metal content of the treated diatomaceous earth.

In one embodiment, the at least one thermal treatment is calcination. Calcination may be conducted according to any appropriate process now known to the skilled artisan or hereafter discovered. In one embodiment, calcination is carried out at temperatures below the melting point of the at least one natural diatomaceous earth. In another embodiment, calcination is carried out at or above the transition temperature of the at least one natural diatomaceous earth and may cause decomposition and/or volatization reactions. In a further embodiment, calcination is carried out at or above the transition temperature of the at least one natural diatomaceous earth and may cause a phase transition. In yet another embodiment, calcination is carried out at temperatures ranging from about 600° C. to about 1200° C. In yet a further embodiment, calcination is carried out at temperatures ranging from about 800° C. to about 900° C. In still another embodiment, calcination is carried out at temperatures ranging from about 900° C. to about 1200° C. In still a further embodiment, calcination is carried out at about 1000° C.

Calcination may be conducted in at least one calcination vessel according to any appropriate process now known to the skilled artisan or hereafter discovered. In one embodiment, calcination is carried out in a furnace. In another embodiment, calcination is carried out in a reactor. In a further embodiment, calcination is carried out in a kiln. In yet another embodiment, calcination is carried out in a rotary kiln. In yet a further embodiment, calcination is carried out in a shaft furnace. In still another embodiment, calcination is carried out in a multiple hearth furnace. In still a further embodiment, calcination is carried out in a fluidized bed reactor. The diatomaceous earth may be retained in the at least one calcination vessel for any appropriate amount of time. In one embodiment, the retention time is from about 4 minutes to about 1 hour. In another embodiment, the retention time is from about 10 to about 30 minutes. In a further embodiment, the retention time is about 20 minutes.

In another embodiment, the at least one thermal treatment is roasting. Roasting may be conducted in at least one roasting vessel according to any appropriate process now known to the skilled artisan or hereafter discovered. Exemplary roasting vessels include, but are not limited to, pre-heaters, flash heaters, flash calciners (e.g., those available from FFE Minerals), flash roasting reactors, and toroidal bed reactors (e.g., the TORBED reactor available from Torftech Ltd. and discussed, for example, in U.S. Pat. No. 6,139,313). In one embodiment, the at least one roasting vessel heats the feed diatomaceous earth. In one embodiment, the at least one roasting vessel uses at least one direct heating mechanism, including but not limited to internal hot air and gas flow. In another embodiment, the at least one roasting vessel uses at least one indirect heating mechanism, including but not limited to external heat sources in combination with any heat transfer surface now known to the skilled artisan or hereafter discovered. In a further embodiment, the at least one roasting vessel uses a counter-current gas flow originating from another step in forming the inventive products described herein, including but not limited to a later calcination step or another process in the treatment plant.

In one exemplary embodiment of a roasting process, the treated diatomaceous earth is first dried in a single stage dryer; then the dried, treated diatomaceous earth is sent to a waste separator to remove any wet end waste; and then the modified diatomaceous earth is roasted in at least one roasting vessel a temperature ranging from about 850° F. to about 1600° F.

Roasting may occur at any appropriate temperature. In one embodiment, the diatomaceous earth is roasted at a temperature ranging from about 850° F. to about 1600° F. (about 427° C. to about 871° C.). In another embodiment, the diatomaceous earth is roasted at a temperature ranging from about 900° F. to about 1000° F. (about 482° C. to about 538° C.). In a further embodiment, the diatomaceous earth is roasted at a temperature ranging from about 1200° F. to about 1292° F. (about 649° C. to about 700° C.).

The diatomaceous earth may be retained in the at least one roasting vessel for any appropriate amount of time. In one embodiment, the retention time is less than about 4 minutes. In another embodiment, the retention time is from about 2 minutes to about 3 minutes. In a further embodiment, the retention time is from about 2 seconds to about 10 seconds.

In a further embodiment, the at least one thermal treatment is microwave heating. In yet another embodiment, the at least one thermal treatment is microwave plasma heating. In yet a further embodiment, the at least one thermal treatment is microwave plasma heating comprising the generation of two large-amplitude coherent electron cyclotron waves in the plasma.

Water Treatment

The diatomaceous earth may be subjected to at least one water treatment before and/or after the at least one thermal treatment. Water treatment is a known practice for reducing the BSI content in diatomaceous earth filter aids.

In one embodiment, the at least one water treatment comprises spraying water to the bottom of a bulk container comprising the filter aids or into bags during packaging. Such water treatments at higher temperatures are generally known to accelerate the BSI reduction process, yet because water treatment generally occurs in an open container, the temperature of the treatment cannot be higher than the boiling point of water. As a result, such water treatments may comprise spraying and mixing water into a diatomite filter aid product while the product is hot (for example, at a temperature ranging from 150° F. to 200° F.).

In another embodiment, the at least one water treatment is a saturated steam treatment in an enclosed vessel. As used herein, the term "saturated steam" refers to steam that is at a temperature of at least the boiling point temperature corresponding to the surrounding pressure. Moreover, the term "saturated steam" also refers to steam containing water that is held in suspension mechanically, and the term may be interchangeable with the terms "wet steam" and "misty steam."

In one embodiment of a saturated steam treatment, the saturated steam treatment comprises mixing the diatomaceous earth material with water and heating the mixture in the enclosed vessel to initiate phase transfer of the water to saturated steam. Without wishing to be bound by theory, a saturated steam treatment may achieve several treatment goals. When water is applied to diatomaceous earth in a gas phase, it generally overcomes surface tension, which limits the surface wetting of the diatomaceous earth that is observed in conventional water treatments. As condensation occurs and the steam converts to water, the consequent energy transfer may also contribute energy to accelerate the hydration of the diatomaceous earth; accordingly, the temperature of the diatomaceous earth must not reach too high a level, as condensation may then not occur. Finally, water condensed in the saturated steam may remain in contact with the surfaces of the diatomaceous earth, limiting dehydration that may occur as the surface temperature increases.

Heating during the saturated steam treatment may be performed by one or more suitable techniques now known to the skilled artisan or hereafter discovered. In one embodiment, heating is by heat generated by an oven. Exemplary ovens include convention ovens and conventional ovens. In another embodiment, heating is by direct fired combustion equipment. In a further embodiment, heating is by indirect fired combustion equipment. In yet another embodiment, to ease the energy requirements of heating, the temperature of the water may be elevated before it is contacted with the diatomaceous earth so that less energy is required to initiate phase transfer; thus, the temperature of the water added may be up to about 99° C. at atmospheric pressure.

Any appropriate amount of water may be used in the saturated steam treatment. In one embodiment, water is used in an amount ranging from about 0.1% to about 10% by weight, relative to the total weight of the diatomaceous earth material. In another embodiment, the water ranges from about 1% to about 9%. In a further embodiment, the water ranges from about 3% to about 7%. In yet another embodiment, the water ranges from about 4% to about 6%.

Water used for saturated steam treatment may be of any appropriate type. In one embodiment, the water is deionized water. In another embodiment, the water is ultrapure water. In a further embodiment, the water is treated to remove or decrease any metals, toxins, and other undesirable elements before it is contacted with the diatomaceous earth material. In yet another embodiment, the water does not include additives, for example salt and/or other non-volatile components, that may raise the boiling point of the water.

The pressure under which a saturated steam treatment may take place is at least about atmospheric pressure. In one embodiment, the pressure ranges from about 29 psig to about 70 psig. In another embodiment, the pressure ranges from about 30 psig to about 68 psig. In a further embodiment, the pressure ranges from about 40 psig to about 55 psig.

In one embodiment, the diatomaceous earth material is directly contacted with saturated steam. In another embodiment, the diatomaceous earth material is indirectly contacted with saturated steam (for example, the steam may contact the outer surface of the enclosed vessel in which the diatomaceous earth is contained).

The saturated steam treatment may be performed for any appropriate length of time. In one embodiment, the saturated steam treatment lasts from about 1 minute to about 24 hours. In another embodiment, the treatment lasts less than about 24 hours. In a further embodiment, the treatment lasts less than about 12 hours. In yet another embodiment, the treatment lasts less than about 6 hours. In yet a further embodiment, the treatment lasts less than about 3 hours. In still another embodiment, the treatment lasts less than about 1 hour. In still a further embodiment, the treatment lasts less than about 30 minutes.

The saturated steam treatment may comprise mixing the diatomaceous earth material with additional water. In one embodiment, the additional water facilitates reduction of BSI. In another embodiment, the additional water provides a source of the steam to hydrate the diatomaceous earth. In a further embodiment, the additional water creates an aqueous slurry of diatomaceous earth material that is subsequently heated with saturated steam. Any appropriate amount of additional water may be used in the saturated steam treatment. In one embodiment, additional water is used in an amount ranging from about 0.1% to about 10% by weight, relative to the total weight of the diatomaceous earth material. In another embodiment, the additional water ranges from about 1% to about 9%. In a further embodiment, the additional water ranges from about 3% to about 7%. In yet another embodiment, the additional water ranges from about 4% to about 6%. The temperature of the additional water is at least about room temperature (about 20° C.) but less than its boiling point.

Measurement of Metal Content

The metal content of a diatomaceous earth material, a liquid, and/or a treated liquid may be measured by any one or more of various measurement techniques now known to the skilled artisan or hereafter discovered. Some measurement techniques may be specific to certain metals; thus, it may be necessary to perform more than one measurement technique to analyze the content of multiple metals. In one embodiment, the ASBC method is used to analyze metal content. In another embodiment, the EBC method is used to analyze metal content. In a further embodiment, a graphite furnace atomic absorption spectrometric (GFAA) method is used to analyze metal content.

Beer Soluble Iron Content

As used herein, the term "beer soluble iron" is interchangeable with the acronym "BSI" and refers to the iron content, which may be measured in parts per million, of a filter aid that dissociates in the presence of a liquid, such as 1% KHP solution used in EBC method. Because BSI content of a filter aid as analyzed by the ASBC method is different from that analyzed by the EBC method, it is convenient to refer the BSI as either ASBC BSI or EBC BSI, depending on the method used. In one embodiment, a thermally-treated diatomaceous earth product has an EBC BSI level of less than about 50 ppm. In another embodiment, a thermally-treated diatomaceous earth product has an EBC BSI level of less than about 25 ppm. In a further embodiment, a thermally-treated diatomaceous earth product has an EBC BSI level of less than about 15 ppm. In yet another embodiment, a thermally-treated diatomaceous earth product has an EBC BSI level of less than about 10 ppm.

It may be useful to measure the improved reduction in BSI in terms of percent reduction relative to a standard or untreated material. In one embodiment, the thermally-treated diatomaceous earth product has a percent reduction in EBC BSI ranging from about 45% to about 100% relative to the natural diatomaceous earth. In another embodiment, the EBC BSI percent reduction ranges from about 65% to about 100%. In a further embodiment, the EBC BSI percent reduction ranges from about 75% to about 100%. In yet another embodiment, the EBC BSI percent reduction ranges from about 85% to about 100%. In yet a further embodiment, the EBC BSI percent reduction ranges from about 95% to about 100%. In still yet another embodiment, the BSI EBC percent is reduced to a level where it becomes undetectable.

Uses of Thermally-Treated Diatomaceous Earth Products

Thermally-treated diatomaceous earth products according to the present invention may be used in any of a variety of processes and materials, including but not limited to filter and/or catalyst processes and compositions.

In one embodiment, the thermally-treated diatomaceous earth product is used as part of a filter aid composition. Such a filter aid composition may optionally comprise at least one additional filter aid medium. Examples of suitable at least one additional filter aid media include, but are not limited to, natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, or clay. The at least one additional filter medium may be present in any appropriate amount. In one embodiment, the at least one additional filter medium is present from about 0.01 to about 100 parts of at least one additional filter medium per part of treated diatomaceous earth material. In another embodiment, the at least one additional filter medium is present from about 0.1 to about 10 parts. In a further embodiment, the at least one additional filter medium is present from about 0.5 to 5 parts. The filter aid composition may be formed into sheets, pads, cartridges, or other monolithic or aggregate media capable of being used as supports or substrates in a filter process. Considerations in the manufacture of filter aid compositions may include a variety of parameters, including but not limited to total BSI of the composition, median BSI of the composition, particle size distribution, pore size, cost, and availability.

A filter aid composition comprising at least one thermally-treated diatomaceous earth product may be used in a variety of processes and compositions. In one embodiment, the filter aid composition is applied to a filter septum to protect it and/or to improve clarity of the liquid to be filtered in a filtration process. In another embodiment, the filter aid composition is added directly to a beverage to be filtered to increase flow rate and/or extend the filtration cycle. In a further embodiment, the filter aid composition is used as pre-coating, in body feeding, or a combination of both pre-coating and body feeding, in a filtration process.

Thermally-treated diatomaceous earth filter aid products of the present invention may also be used in a variety of filtering methods. In one embodiment, the filtering method comprises pre-coating at least one filter element with at least one thermally-treated diatomaceous earth filter aid, and contacting at least one liquid to be filtered with the at least one coated filter element. In such an embodiment, the contacting may comprise passing the liquid through the filter element. In another embodiment, the filtering method comprises suspending at least one thermally-treated diatomaceous earth filter aid in at least one liquid containing particles to be removed from the liquid, and then separating the filter aid from the filtered liquid.

Thermally-treated diatomaceous earth filter aids may also be employed to filter various types of liquids, particularly those liquids that would be deleteriously affected by an increase in metal content during filtration. The skilled artisan is readily aware of liquids that may be desirably filtered with a process comprising the thermally-treated diatomaceous earth filter aids disclosed herein. In one embodiment, the liquid is a beverage. Exemplary beverages include, but are not limited to, vegetable-based juices, fruit juices, distilled spirits, and malt-based liquids. Exemplary malt-based liquids include, but are not limited to, beer and wine. In another embodiment, the liquid is one that tends to form haze upon chilling. In a further embodiment, the liquid is a beverage that tends to form haze upon chilling. In yet another embodiment, the liquid is a beer. In yet a further embodiment, the liquid is an oil. In still another embodiment, the liquid is an edible oil. In still a further embodiment, the liquid is a fuel oil. In another embodiment, the liquid is water, including but not limited to waste water. In a further embodiment, the liquid is blood. In yet another embodiment, the liquid is a sake.

Also described, in one embodiment, is a method not only to reduce the soluble metal content of the at least one natural diatomaceous earth, but also to reduce the soluble metal content of the at least one liquid media being filtered. Without wishing to be bound by theory, it is believed that after the at least one thermal treatment the diatomaceous earth surfaces can be modified with the bonded or impregnated phosphorous ligands from the at least one surface metal blocking agent, which will then help produce chelating surfaces for iron and other metals; by that mechanism, the soluble metal content of the liquid media itself may be reduced when the liquid is passed over or through a filter aid composition comprising the thermally-treated diatomaceous earth product.

Thermally-treated diatomaceous earth products disclosed herein may also be used in applications other than filtration. In one embodiment, the thermally-treated diatomaceous earth products are used as composites in filler applications. In another embodiment, the thermally-treated diatomaceous earth products are used to alter the appearance and/or properties of paints, enamels, lacquers, or related coatings and finishes. In a further embodiment, the thermally-treated diatomaceous earth products are used in paper formulations and/or paper processing applications. In yet another embodiment, the thermally-treated diatomaceous earth products are used to provide anti-block and/or reinforcing properties to polymers. In yet a further embodiment, the thermally-treated diatomaceous earth products are used as or in abrasives. In still another embodiment, the thermally-treated diatomaceous earth products are used for buffing or in buffing compositions. In still a further embodiment, the thermally-treated diatomaceous earth products are used for polishing or in polishing compositions. In another embodiment, the thermally-treated diatomaceous earth products are used in the processing and/or preparation of catalysts. In a further embodiment, the thermally-treated diatomaceous earth products are used as chromatographic supports or other support media. In yet another embodiment, the thermally-treated diatomaceous earth products are blended, mixed, or otherwise combined with other ingredients to make monolithic or aggregate media useful in a variety of applications, including but not limited to supports (for example, for microbe immobilization) and substrates (for example, for enzyme immobilization). In yet a further embodiment, the thermally-treated diatomaceous earth products are used in plastics, including but not limited to polyolefin films (agricultural films). Without wishing to be bound by theory, the thermally-treated diatomaceous earth products, in some embodiments, provide better ultraviolet light stability in plastics including but not limited to thin polyolefin films because of the reduced solubility or migration of iron in the plastic.

Unless otherwise indicated, all numbers expressing quantities of ingredients, reaction conditions, and so forth used in the specification, including the claims, are to be understood as being modified in all instances by the term "about." Accordingly, unless otherwise indicated to the contrary, the numerical parameters are approximations and may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Combinations of the various listed embodiments are contemplated. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

EXAMPLES

Parameters

Three samples of natural diatomaceous earth material were used as natural diatomaceous earth in these examples: (1) Mexican MNPP (a natural freshwater diatomaceous earth material from Mexico); (2) American kiln feed from marine diatomaceous earth material; and (3) Chinese kiln feed from Chinese freshwater diatomaceous earth material. The samples of diatomaceous earth tested were all commercially available from World Minerals, Inc.

Phosphorus-containing compounds were used in these experiments as outlined in Table 1.

TABLE 1

Phosphate Compounds Used in Examples

| Name | Compound |
|---|---|
| Sodium Tripolyphosphate | $Na_5P_3O_{10}$ |
| Sodium Phosphate | $Na_3PO_4$ |
| Sodium Phosphate, Dibasic | $Na_2HPO_4$ |
| Sodium Pyrophosphate | $Na_4P_2O_7 \cdot 10H_2O$ |
| Sodium Hexametaphosphate | $(NaPO_3)_6$ |
| Potassium Phosphate, Monobasic | $KH_2PO_4$ |
| Aluminum Phosphate | $AlPO_4$ |
| Spent DE Waste Cake | 8.8% (w/w) $P_2O_5$ |

The samples of diatomaceous earth in each example measured about 25 g to about 100 g each and were treated with a given amount of the at least one surface metal blocking agent in a mixing container and mixed at ambient temperature for at least about 5 minutes to allow the powders of the blocking agent to thoroughly mix with the diatomaceous earth, before any described thermal treatment was performed.

The thermal treatment methods employed were laboratory muffle furnace calcinations, using a Thermolyne Model FA1850-1, in which the feed diatomaceous earth powder is placed into a ceramic crucible and calcined at the desired temperature for about 20 minutes to about 30 minutes. After calcination, the powder was allowed to cool to room temperature and dispersed through a 28 mesh (600 micron opening) sieve. BSI was then measured according to either the EBC method or the ASBC.

Example 1

Calcined Mexican Diatomaceous Earth

Table 2 shows the BSI in parts per million, as measured by the EBC method, of a thermally-treated diatomaceous earth product made from contacting natural Mexican diatomaceous earth with the listed phosphorus-containing compounds, followed by calcination. The calcination took place at about 1030° C. for about 30 minutes.

TABLE 2

EBC BSI (ppm) in Mexican Diatomaceous Earth After Straight Calcination with Phosphorous Components

| P-Compound (%) | $Na_3PO_4$ | $Na_2HPO_4$ | $Na_5P_3O_{10}$ | $(NaPO_3)_6$ | $Na_4P_2O_7 \cdot 10H_2O$ | $AlPO_4$ | $KH_2PO_3$ |
|---|---|---|---|---|---|---|---|
| 0.0 | 107.0 | 107.0 | 107.0 | 107.0 | 107.0 | 107.0 | 107.0 |
| 0.5 | 81.9 | 112.0 | 81.5 | 92.6 | 88.8 | 100.9 | 93.3 |

TABLE 2-continued

EBC BSI (ppm) in Mexican Diatomaceous Earth After Straight Calcination with Phosphorous Components

| P-Compound (%) | $Na_3PO_4$ | $Na_2HPO_4$ | $Na_5P_3O_{10}$ | $(NaPO_3)_6$ | $Na_4P_2O_7 \cdot 10H_2O$ | $AlPO_4$ | $KH_2PO_3$ |
|---|---|---|---|---|---|---|---|
| 1.0 | 85.4 | 109.0 | 59.3 | 94.2 | 71.5 | 101.9 | 76.7 |
| 2.0 | 45.4 | 70.1 | 35.8 | 34.4 | 81.0 | 99.9 | 40.6 |
| 4.0 | 34.0 | 10.8 | 18.2 | 15.3 | 39.7 | 92.6 | 17.8 |

As shown in Table 2, when the BSI was measured according to the EBC protocol, the BSI contents of the samples generally decreased with the increased dosage of phosphorus-containing compounds.

Example 2

Flux-Calcined Mexican Diatomaceous Earth

Table 3 shows the BSI in parts per million, as measured by the EBC method, of a flux-calcined diatomaceous earth product made from contacting natural Mexican diatomaceous earth with about 5% soda ash and the listed phosphorus-containing compounds. The flux calcination took place at about 1032° C. for about 30 minutes, with about 5% soda ash.

TABLE 3

EBC BSI (ppm) in Mexican Diatomaceous Earth After Flux Calcination with Phosphorous Compounds

| P-Compound (%) | $Na_3PO_4$ | $Na_2HPO_4$ | $Na_5P_3O_{10}$ | $(NaPO_3)_6$ | $AlPO_4$ |
|---|---|---|---|---|---|
| 0 | 90.3 | 90.3 | 90.3 | 90.3 | 90.3 |
| 0.5 | 60.5 | 77.1 | 53.6 | 62.5 | 91.9 |
| 1.0 | 33.0 | 44.7 | 41.9 | 47.7 | 85.0 |
| 2.0 | 26.1 | 11.6 | 32.0 | 36.3 | 44.8 |
| 4.0 | 19.2 | 8.0 | 35.7 | 47.3 | 35.1 |

As shown in Table 3, when the BSI was measured according to the EBC protocol, the BSI contents of the flux-calcined samples generally decreased with the increased dosage of the soluble metal blocking agent.

Example 3

Flux-Calcined Linjiang Diatomaceous Earth

Table 4 shows the BSI in parts per million, as measured by the EBC method, of a flux-calcined diatomaceous earth product made from contacting Chinese Linjiang natural diatomaceous earth with about 5% soda ash and the listed phosphorus-containing compounds. The flux calcination took place at about 1032° C. for about 30 minutes, with about 5% soda ash.

TABLE 4

EBC BSI (ppm) in Linjiang Diatomaceous Earth After Flux Calcination with Phosphorous Compounds

| P-Compound (%) | $AlPO_4$ | $Na_3PO_4$ | $Na_2HPO_4$ | $Na_5P_3O_{10}$ |
|---|---|---|---|---|
| 0.0 | 89.2 | 89.2 | 89.2 | 89.2 |
| 0.5 | 76.6 | 72.6 | 66.2 | 45.1 |
| 1.0 | 66.9 | 45.0 | 32.7 | 35.5 |
| 2.0 | 39.8 | 22.8 | 16.9 | 18.9 |
| 4.0 | 61.7 | 19.6 | 6.8 | 20.4 |

As shown in Table 4, when the BSI was measured according to the EBC protocol, the BSI contents of the flux-calcined samples generally decreased with the increased dosage of the soluble metal blocking agent.

Example 4

Calcined Lompoc Diatomaceous Earth

Table 5 shows the BSI in parts per million, as measured by the EBC method, of a thermally-treated diatomaceous earth product made from contacting natural Lompoc diatomaceous earth with the listed phosphorus-containing compounds, followed by calcination. The calcination took place at about 1032° C. for about 30 minutes.

TABLE 5

EBC BSI (ppm) in Straight Calcined Lompoc Diatomaceous Earth

| P-compound (%) | $Na_2HPO_4$ | $Na_4P_2O_7 \cdot 10H_2O$ |
|---|---|---|
| 0.0 | 82.0 | 82.0 |
| 0.5 | 71.1 | 59.0 |
| 1.0 | 64.3 | 67.8 |
| 2.0 | 37.8 | 52.0 |
| 4.0 | 22.2 | 23.2 |

Example 5

Flux-Calcined Lompoc Diatomaceous Earth

Table 6 shows the BSI in parts per million, as measured by the EBC method, of a flux-calcined diatomaceous earth product made from contacting natural Lompoc diatomaceous earth with about 5% soda ash and the listed phosphorus-containing compounds. The flux calcination took place at about 1032° C. for about 30 minutes, with about 5% soda ash.

TABLE 6

EBC BSI (ppm) in Flux Calcined Lompoc Diatomaceous Earth

| P-compound (%) | Na$_2$HPO$_4$ | AlPO$_4$ |
|---|---|---|
| 0.0 | 85.0 | 85.0 |
| 0.5 | 72.0 | 78.1 |
| 1.0 | 35.2 | 57.9 |
| 2.0 | 12.5 | 27.3 |
| 4.0 | 3.2 | 22.3 |

Example 6

Flux-Calcined Diatomaceous Earth with Phosphorus-Containing Spent Filter Cake Table 7 shows the BSI in parts per million, as measured by the EBC method, of flux-calcined diatomaceous earth product made from contacting both Chinese Linjiang natural diatomaceous earth and natural Mexican diatomaceous earth with spent filter cake powders containing at least one soluble metal blocking agent. The flux calcination took place at about 1032° C. for about 30 minutes, with about 5% soda ash. The spent cake was dried and dispersed in a powdered form, the phosphorous compounds in the cake were believed to be associated mostly with organics, since the proteins or yeasts retained in the spent cake were believed to contribute most to the phosphorus content.

TABLE 7

EBC BSI (ppm) in Flux-Calcined Diatomaceous Earth with addition of Phosphorus-Containing Filter Cake

| Spent Cake (%) | Linjiang DE | Mexican DE |
|---|---|---|
| 0 | 116.3 | 116.3 |
| 10.0 | 77.9 | 75.2 |
| 20.0 | 56.1 | 42.3 |
| 40.0 | 31.3 | 13.4 |

In Examples 1 to 6, diatomaceous earth treated with a soluble metal blocking agent followed by calcination showed significant reduction of EBC BSI over calcined diatomaceous earth without treatment with a soluble metal blocking agent. Unexpectedly and surprisingly, the results indicate that, use of a small amount of the soluble metal blocking agents (e.g., typically less than 5%), with thermal treatment, significantly reduced the EBC BSI over calcined diatomaceous earth materials without treatment. On the EBC scale, most diatomaceous earth samples measured BSI reductions of 45% or more after treatment with a soluble metal blocking agent.

Example 7

Calcined Diatomaceous Earth with Phosphorus-Containing Compound Treatment and Water Treatment In this example, two types of natural diatomaceous earth (Linjiang and Lompoc) were treated with AlPO$_4$ in accordance with the described inventions, followed by calcination, then followed by water treatment. The water treatment was performed by weighing about 100 g of calcined, AlPO$_4$-treated DE into a Kerr self-sealing Mason Jar, and about 4 g water was added before sealing. The tightly sealed Mason Jar was then place in a laboratory oven set at about 105° C. for about 1 hour. After the water treatment, the bottle jar was allowed to cool to room temperature. The BSI levels of calcined samples and of water treated samples were analyzed by both the EBC and ASBC methods. The results showed that water treatment generally further reduced BSI levels in the DE, particularly when measured by ASBC methods.

What is claimed is:

1. A process for making a low soluble metal content diatomaceous earth product, comprising:
   treating at least one dry natural diatomaceous earth with at least one dry phosphorus-containing compound; and
   subjecting the phosphorus-treated diatomaceous earth material to at least one thermal treatment;
   wherein the at least one phosphorus-containing compound is present in an amount ranging from about 0.2% to about 2%, relative to the weight of the at least one natural diatomaceous earth, and
   wherein the thermally-treated diatomaceous earth material possesses a soluble metal content less than about 40 ppm, as measured by EBC.

2. The process of claim 1, wherein the low soluble metal content diatomaceous earth product is a particulate.

3. The process of claim 1, wherein the at least one phosphorus-containing compound comprises at least one phosphate.

4. The process of claim 3, wherein the at least one phosphate is chosen from the group consisting of sodium triphosphate, sodium phosphate, sodium pyrophosphate, sodium hexametaphosphate, monobasic potassium phosphate, potassium phosphate, and aluminum phosphate.

5. The process of claim 3, wherein the at least one phosphate is dibasic sodium phosphate.

6. The process of claim 1, wherein the thermally-treated diatomaceous earth material possesses a soluble metal content less than about 20 ppm, as measured by EBC.

7. The process of claim 6, wherein the thermally-treated diatomaceous earth material possesses a soluble metal content less than about 10 ppm, as measured by EBC.

8. The process of claim 1, wherein the soluble metal content of the thermally-treated diatomaceous earth material is about 50% less than the soluble metal content of the at least one natural diatomaceous earth, as measured by EBC.

9. The process of claim 8, wherein the soluble metal content of the thermally-treated diatomaceous earth material is about 70% less than the soluble metal content of the at least one natural diatomaceous earth, as measured by EBC.

10. The process of claim 9, wherein the soluble metal content of the thermally-treated diatomaceous earth material is about 90% less than the soluble metal content of the at least one natural diatomaceous earth, as measured by EBC.

11. The process of claim 1, wherein the at least one thermal treatment is chosen from the group consisting of calcination, flux calcination, roasting, and microwave plasma heating.

12. The process of claim 1, wherein the at least one natural diatomaceous earth is treated with the at least one phosphorus-containing compound in an amount ranging from about 0.5% to about 1%, relative to the weight of the at least one natural diatomaceous earth.

13. The process of claim 1, wherein the process does not include an acid washing step.

14. A thermally-treated diatomaceous earth material comprising at least one phosphorus-containing compound, wherein the material has a soluble metal content less than about 40 ppm, as measured by EBC.

15. A particulate filter aid composition comprising the thermally-treated diatomaceous earth material of claim 14.

16. A method of filtering a liquid, comprising passing the liquid through at least one filter membrane comprising a thermally-treated diatomaceous earth material comprising at least one phosphorus-containing compound, wherein the material has a soluble metal content less than about 40 ppm, as measured by EBC.

17. The method of claim 16, wherein the at least one phosphorus-containing compound is present in an amount ranging from about 0.2% to about 2%, relative to the weight of the at least one diatomaceous earth feed material.

18. The method of claim 16, wherein the liquid is chosen from a beverage, an edible oil, and a fuel oil.

19. The method of claim 18, wherein the beverage is a beer.

20. The method of claim 18, wherein the beverage is a wine.

* * * * *